| (12) | United States Patent | (10) Patent No.: | US 10,931,093 B2 |
|---|---|---|---|
| | Gerdinand et al. | (45) Date of Patent: | Feb. 23, 2021 |

(54) DISCONNECT SWITCH FOR INTERUPPTION DC CIRCUIT BETWEEN DC POWER SOURCE AND LOAD

(71) Applicant: Ellenberger & Poensgen GmbH, Altdorf (DE)

(72) Inventors: Frank Gerdinand, Helmstedt (DE); Peter Meckler, Hohenstadt/Pommelsbrunn (DE); Markus Miklis, Pfeifferhuette (DE); Michael Naumann, Feucht (DE); Christian Strobl, Nuremberg (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 421 days.

(21) Appl. No.: 15/383,416

(22) Filed: Dec. 19, 2016

(65) Prior Publication Data

US 2017/0098931 A1   Apr. 6, 2017

Related U.S. Application Data

(63) Continuation of application No. PCT/EP2015/000576, filed on Mar. 16, 2015.

(30) Foreign Application Priority Data

Jun. 18, 2014  (DE) ..................... 10 2014 008 706.9

(51) Int. Cl.
  *H02H 3/087* (2006.01)
  *H01H 9/54* (2006.01)
  (Continued)

(52) U.S. Cl.
  CPC ............ *H02H 3/087* (2013.01); *H01H 9/542* (2013.01); *H01H 9/548* (2013.01); *H01H 71/1009* (2013.01); *H01H 2071/124* (2013.01)

(58) Field of Classification Search
  CPC ....... H01H 2009/544; H01H 2009/546; H01H 2071/124; H01H 2083/201; H01H 47/32;
  (Continued)

(56) References Cited

U.S. PATENT DOCUMENTS 4,764,836 A   8/1988  Mauthe et al.
4,816,958 A *  3/1989  Belbel ................. H01H 33/161
                                                361/11
(Continued)

FOREIGN PATENT DOCUMENTS

CN    1452194 A   10/2003
CN  102349124 A    2/2012
(Continued)

OTHER PUBLICATIONS

Japanese Office Action dated Aug. 21, 2018 in corresponding application 2016-569977.
(Continued)

*Primary Examiner* — Jared Fureman
*Assistant Examiner* — Nicolas Bellido
(74) *Attorney, Agent, or Firm* — Muncy, Geissler, Olds & Lowe, P.C.

(57) ABSTRACT

A disconnecting device for interrupting the direct current between a direct current source, in particular in the direct voltage range between 300 VDc and/or in the nominal current range between 4A and 250A, and a load. The device has at least one protection switch with a protection switch arrangement having a magnetic trigger, and has semiconductor electronics which are connected in parallel to the at least one protection switch and which block the current when the protection switch arrangement is in a current-conducting state and which conducts current at least temporarily when the protection switch arrangement is triggered. A current, in particular an electric arc current
(Continued)

generated as a result of an electric arc, is switched, when the protection switch arrangement is triggered, from the at least one protection switch to the semiconductor electronics.

16 Claims, 3 Drawing Sheets

(51) Int. Cl.
  *H01H 71/10* (2006.01)
  *H01H 71/12* (2006.01)

(58) Field of Classification Search
  CPC ............ H01H 71/1009; H01H 71/123; H01H 71/125; H01H 83/04; H01H 83/144; H01H 83/20; H01H 9/30; H01H 9/541; H01H 9/542; H01H 9/548; H01H 9/56; H02H 1/0007; H02H 1/0015; H02H 1/06; H02H 3/021; H02H 3/05; H02H 3/08; H02H 3/087; H02H 3/10; H02H 3/335; H02H 3/44; H02H 5/04; H02H 7/222; H02H 7/268; H02H 9/02; H02H 9/025; H02J 1/00
  USPC .................................. 361/100–103
  See application file for complete search history.

(56) References Cited

U.S. PATENT DOCUMENTS

| | | | |
|---|---|---|---|
| 5,410,442 A * | 4/1995 | Pohl | H01H 9/542 361/102 |
| 5,519,561 A * | 5/1996 | Mrenna | H02H 1/0015 337/108 |
| 5,650,901 A | 7/1997 | Yamamoto | |
| 6,643,112 B1 * | 11/2003 | Carton | H01H 9/54 218/3 |
| 7,079,363 B2 | 7/2006 | Chung | |
| 8,742,828 B2 * | 6/2014 | Naumann | H01H 9/542 327/419 |
| 8,879,218 B2 * | 11/2014 | Tomimbang | H02H 1/0015 361/42 |
| 9,543,088 B2 | 1/2017 | Merz et al. | |
| 10,290,445 B2 * | 5/2019 | Schmitz | H01H 33/596 |
| 2015/0179363 A1 | 6/2015 | Wiersch et al. | |
| 2016/0322184 A1 * | 11/2016 | Schmitz | H01H 33/596 |

FOREIGN PATENT DOCUMENTS

| | | | |
|---|---|---|---|
| CN | 101752148 B * | 8/2014 | |
| DE | 196 19 437 A1 | 11/1997 | |
| DE | 19619437 A1 * | 11/1997 | H01H 9/542 |
| DE | 10 2005 006 953 A1 | 8/2006 | |
| DE | 20 2009 004 198 U1 | 9/2010 | |
| DE | 10 2009 059 839 A1 | 6/2011 | |
| DE | 10 2011 056 577 N3 | 5/2013 | |
| DE | 20 2012 007 257 U1 | 12/2013 | |
| EP | 0 231 469 A1 | 8/1987 | |
| EP | 2 320 535 A1 | 5/2011 | |
| EP | 2320535 A1 * | 5/2011 | H01H 71/1081 |
| JP | S6178020 A | 4/1986 | |
| JP | H07052612 B | 5/1986 | |
| JP | H 08-315666 A | 11/1996 | |
| JP | 2006032121 A | 2/2006 | |
| JP | 2009206066 A | 9/2009 | |
| JP | 2011-222414 A | 11/2011 | |
| JP | 2012119104 A | 6/2012 | |
| JP | 2012-521620 A | 9/2012 | |
| JP | 2013-041782 A | 2/2013 | |
| WO | WO 2010/108565 A1 | 9/2010 | |

OTHER PUBLICATIONS

Chinese Office Action for Chinese Application No. 201580032448.4 dated Feb. 5, 2018 with English translation.
Japanese Office Action for Japanese Application No. 2016-589977 dated Feb. 22, 2018 —English translation.

* cited by examiner

DISCONNECT SWITCH FOR INTERUPPTION DC CIRCUIT BETWEEN DC POWER SOURCE AND LOAD

This nonprovisional application is a continuation of International Application No. PCT/EP2015/000576, which was filed on Mar. 16, 2015, and which claims priority to German Patent Application No. 10 2014 008 706.9, which was filed in Germany on Jun. 18, 2014, and which are both herein incorporated by reference.

BACKGROUND OF THE INVENTION

Field of the Invention

The invention relates to a disconnecting device for direct current interruption between a direct current power source and an electrical device or a load. A direct current (DC) in this event can be understood to be a nominal current range between $4 A_{DC}$ and $250 A_{DC}$ in a DC voltage range between $300V_{DC}$ and $1500V_{DC}$.

Description of the Background Art

Since such a DC voltage source, for example, of a photovoltaic system, as determined by the system on the one hand permanently provides an operating current and an operating voltage in the range between 180V (DC) and 1500V (DC), and on the other hand—for example, for purposes of installation, assembly or service as well as for general personal protection—a reliable separation of electrical components, installations and/or a load of the DC power source is desired, an appropriate disconnecting device must be able to interrupt under load, i.e., without previously switching off the DC power source.

For load separation, a mechanical switch (switching contact) can be used with the advantage that upon opening of the contact, galvanic isolation of the electrical device (inverter) from the DC power source (photovoltaic system) is established. It is, however, a disadvantage that such mechanical switching contacts wear down very quickly due to the arc formed during contact opening, or that an additional effort is required to enclose and cool the arc, which is usually done by a corresponding mechanical switch with an arcing chamber.

If in contrast powerful semiconductor switches are used for load separation, then even during normal operation unavoidable power losses occur at the semiconductors. In addition, with such power semiconductors, galvanic isolation and thus also reliable personal protection are not ensured.

From WO 2010/108565 A1, a disconnecting device with a mechanical switch is known, which is energized in the non-triggered state of the disconnecting device. A semiconductor electronics is connected in parallel with the mechanical switch, said semiconductor electronics being connected to the mechanical switch such that when the mechanical switch is opening to interrupt the current flow, the semiconductor electronics is switched to conduct current by means of the disconnecting device, due to an arc forming in the region of the mechanical switch.

For this purpose, the semiconductor electronic has an energy store which due to the arc is charged within the duration of the arc, and by means of which the semiconductor electronics is operated. Due to the electrical conductivity of the semiconductor circuit in the event of an arc, a comparatively low-ohmic current path is connected in parallel thereto, resulting in a comparatively early extinction of the arc and thus a comparatively low load of the disconnecting device or the interruption unit.

SUMMARY OF THE INVENTION

It is therefore an object of invention to provide a particularly suitable disconnecting device for the interruption of a DC circuit between a DC power source and an electrical device or a load.

In an exemplary embodiment, the disconnecting device can also be referred to as a hybrid circuit breaker that comprises at least one current-carrying circuit breaker with a circuit breaker arrangement containing a magnetic trigger and one semiconductor electronics switched in parallel with the at least one circuit breaker of the circuit breaker arrangement, the semiconductor electronics essentially can comprise at least one semiconductor switch, for example, an IGBT. A circuit breaker with a magnetic trigger is understood to be one having a purely magnetic, thermal-magnetic or hydraulic-mechanical trigger and thus generally a magnetic, thermal-magnetic or hydraulic-mechanical circuit breaker.

The semiconductor electronics is provided and set up to be current-blocking in a current-carrying circuit breaker, and in the event of the circuit breaker being tripped due to an overcurrent and/or a switching signal, to at least temporarily conduct current, because when the circuit breaker is triggered, the current, i.e. an arc current generated due to the arc, commutates from the circuit breaker to the semiconductor electronics.

The semiconductor electronics of the circuit breaker according to the invention can, for example, have no additional power source and is therefore current-blocking, i.e. high-ohmic and thus virtually without current or voltage when the mechanical switch is closed. Since in closed mechanical switching contacts of the or of each circuit breaker of the circuit breaker arrangement no current flows over the semiconductor electronics, and therefore in particular no voltage drop occurs on the or on each semiconductor switch, the semiconductor circuit produces no performance losses when the switching contacts of the circuit breaker arrangement are closed. Rather, the semiconductor electronics receives the energy necessary for its operation from the disconnecting device itself. To this end, the energy of an arc formed during opening of the switching contacts of the or of each circuit breaker of the circuit breaker arrangement is used. In this regard, suitably a control input of the semiconductor electronics or of the semiconductor switch is interconnected such with the or with each circuit breaker that when opening switching contacts of the circuit breaker arrangement, the arc voltage switches the semiconductor electronics parallel thereto in a current-conducting, i.e. low-impedance and thus energized manner.

Once the semiconductor electronics is switched slightly current-conducting, the arc current begins to commutate from the circuit breaker or from the switching contacts of said breaker to the semiconductor electronics. Because in an advantageous embodiment the circuit breaker arrangement of the disconnecting device comprises at least two circuit breakers, which are, or whose switching contacts are, connected in series, and at least one circuit breaker of the circuit breaker arrangement is connected in series with the semiconductor electronics, in the event of the triggering of the circuit breaker arrangement, a galvanic isolation of the load from the DC power source is achieved, and thus, by opening this hybrid circuit breaker, complete galvanic direct current interruption.

According to an embodiment of the disconnecting device, this has a module (arc fault module) for arc detection and/or for arc recognition. This module interacts with a current sensor for detecting the current flowing through the or through each circuit breaker, and is thus electrically connected to the current sensor. The module evaluates the detected current with regard to its temporal profile and/or its slope (dI/dt). If a particular characteristic of the detected current is recognized, when, for example, an arc is indicated, the module transmits a trigger signal to the or to each circuit breaker for its release. For this purpose, the module is preferably connected to a motor or magnetic drive, said drive being coupled to the or to each circuit breaker or to its/their switching mechanism to separate the circuit breaker contacts.

The disconnecting device may be designed two-pole or four-pole. In the event of the four-pole disconnecting device, at least one circuit breaker of the circuit breaker arrangement, preferably a series connection of at least two circuit breakers having circuit breaker isolating contacts, is connected in a main current path (plus current path) of the disconnecting device. Additionally, or alternatively, at least one circuit breaker or circuit breaker isolating contact of the circuit breaker arrangement is connected in the return current path (negative current path) of the disconnecting device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
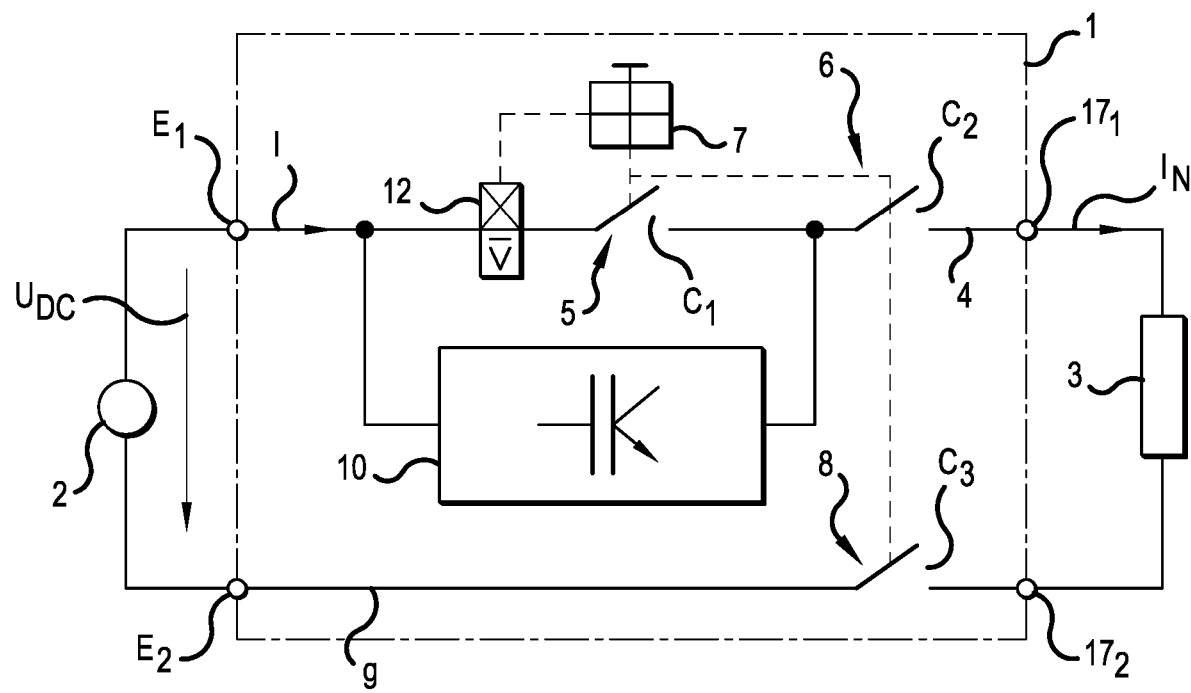
FIG. 1 illustrates a block diagram of a four-pole version of the disconnecting device with a circuit breaker arrangement with a series circuit of three magnetic/magnetic-hydraulic circuit breakers and a semiconductor electronics situated parallel to one of the circuit breakers or to their switching contacts.

FIG. 1 schematically shows a disconnecting device 1 which is connected in the embodiment between a DC voltage source 2 for generating a DC voltage $U_{DC}$ and a direct current $I_N$ as well as a load 3. In the main current path or positive path 4 representing the positive terminal, the disconnecting device 1 comprises a circuit breaker arrangement in the form of a series circuit of two magnetic, in particular hydraulic-magnetic, circuit breakers 5, 6, whose switching contacts coupled to a switching mechanism 7 are designated $C_1$ and $C_2$. Another circuit breaker 8 or switching contact $C_3$ is switched to the return current or negative path (return line) 9 of the disconnecting device 1 and is also coupled to the switching mechanism 7.

A semiconductor electronics 10 is connected in parallel to one of the circuit breakers 5, 6, 8, here, circuit breaker 5 or its switching contact $C_1$. The circuit breakers 5, 6, 8 and the semiconductor electronics 10 form a self-sufficient hybrid circuit breaker used as a disconnecting device 1 for nominal DC currents (direct currents) $I_N$ between 4A and 250A at a DC voltage $U_{DC}$ between $300V_{DC}$ and $1500V_{DC}$. The semiconductor electronics 10 essentially comprises at least one semiconductor switch 10a, 10b, which is connected in parallel to the circuit breaker 5 of the circuit breaker arrangement 5, 6, 8. The gate of an IGBT preferably used as a semiconductor switch 10b forms the control input or a control terminal 11 of the semiconductor circuit 10. This control input or control terminal 11 may be guided over a drive circuit to the main current path 4.

Figure 2:
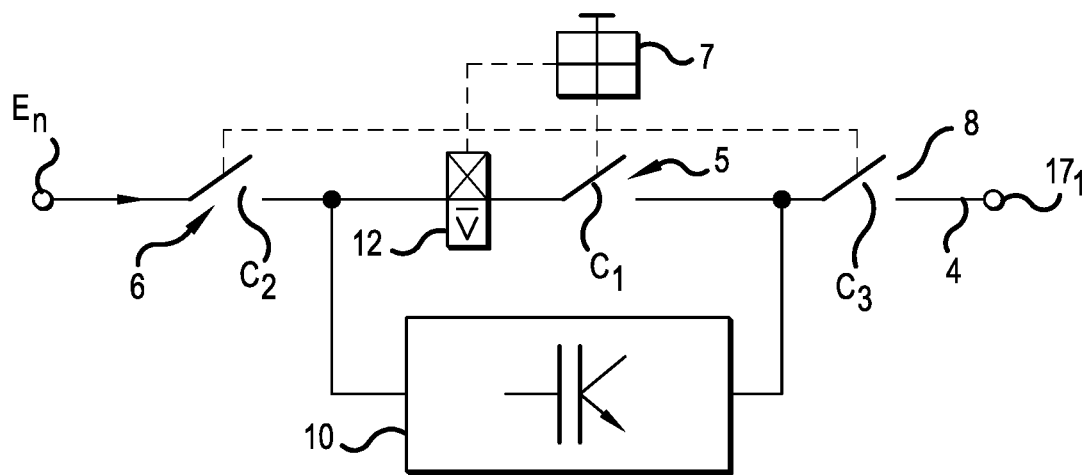
FIG. 2 illustrates a block diagram according to FIG. 1 of a two-pole variant of the disconnecting device.

Whereas FIG. 1 shows a four-pole disconnecting device 1 or a four-pole hybrid circuit breaker with supply-side inputs or input terminals $E_1$ and $E_2$, as well as load-side outputs or output terminals $A_1$ and $A_2$, a two-pole disconnecting device 1 or a two-pole hybrid circuit breaker is depicted in FIG. 2. The respective circuit breakers 5, 6, 8 or their switching contacts $C_1$, $C_2$, $C_3$ can each have a switching mechanism 7 and a magnetic or magnetic-hydraulic trigger 12. Suitably, however—as shown—the circuit breakers 5, 6, 8 are assigned a common switching mechanism 7 and a common trigger (tripping device) 12. The switching contacts $C_n$ of the further circuit breakers are then coupled preferably mechanically to the switching mechanism 7 of the main circuit breaker, in this event the circuit breaker 5, to cause an at least approximately simultaneous tripping of the circuit breakers 5, 6, 8 and contact separation of the switching contacts $C_n$ of all the circuit breakers 5, 6, 8 of the circuit breaker arrangement.

Figure 3:
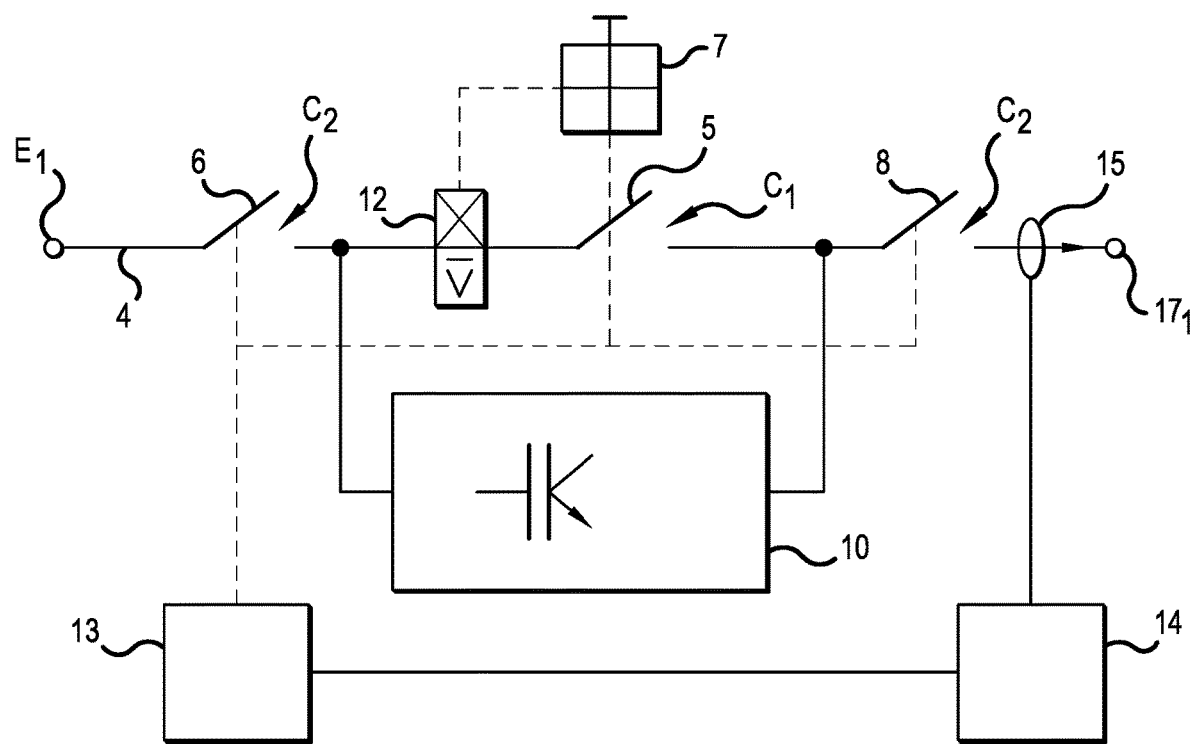
FIG. 3 illustrates a block diagram of the two-pole disconnecting device with an arc fault module and a drive for triggering the circuit breaker arrangement.

The embodiment of the disconnecting device 1 or the hybrid circuit breaker shown in FIG. 3 is, in turn, two-poled, whereby this embodiment can also be analogously designed as a four-pole disconnecting device 1.

In this embodiment, the circuit breakers 5, 6, 8 or their switching contacts $C_n$ are assigned a drive 13 designed as a motor or magnetic system. To trip the circuit breaker, a control signal $S_A$ is supplied to said system from a module 14, which is hereinafter referred to as arc fault modules for arc detection or for recognition of an overcurrent. The module 14 is connected to a current sensor 15 which detects the current I preferably flowing in the main current path 4. The detected current I is evaluated by means of the module 14.

If certain criteria are met, for example, by exceeding a current limit with 105% to 150% of the nominal current ($1.05 \cdot I_N$ to $1.5 \cdot I_N$) and/or in the event of a certain current slope (dI/dt), the control or trigger signal is generated by means of the module 14. Consequently, the circuit breakers 5, 6, 8 of the circuit breaker arrangement are triggered substantially simultaneously. An arc emerging while opening the switching contacts $C_n$ of said breakers causes a corresponding arc voltage and a corresponding arc current, which switches the previously current-blocking semiconductor electronics 10 to the energized state so that the current flowing in the main current path 4 is commutated to the semiconductor electronics 10 and is taken over by said electronics until the arc is extinguished.

The semiconductor electronics 10 assumes switch currents up to a value of about 1000 A within a very short time, wherein the commutation within an appropriate time range of 50 µs to 300 µs is dependent on the circuit inductance. At higher switch currents, the circuit breaker arrangement 5, 6, 8 alone assumes the disconnection and limitation of the current.

Figure 4:
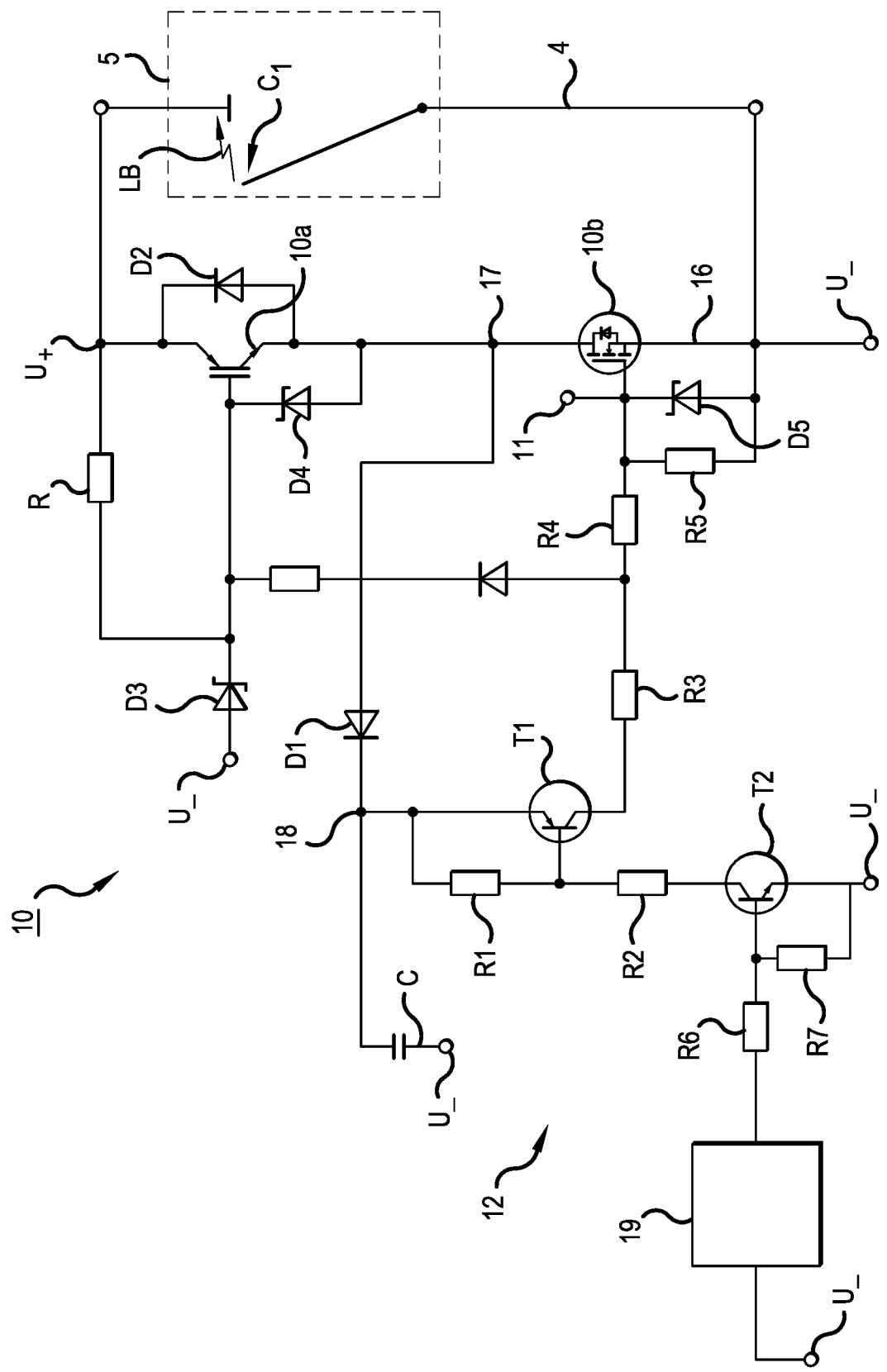
FIG. 4 illustrates the circuit diagram of a generally known semiconductor electronics of the disconnecting device.

FIG. 4 shows the circuit of a possible, preferable semiconductor electronics 10 which is connected as a disconnecting device 1 in parallel to the circuit breaker 5 of the circuit breaker arrangement 5, 6, 8 of the self-sufficient hybrid circuit breaker. It can be seen that a first semiconductor switch (IGBT) 10a is connected in series in a cascode configuration with a second semiconductor switch 10b in the form of a MOSFET. The cascode arrangement with the two semiconductor switches 10a, 10b thus forms, analogous to FIG. 1, the commutation path 16 parallel to the circuit breaker 5 of the circuit breaker arrangement 5, 6, 8, and thus to the main current path 4. The first semiconductor switch 10a is guided between the DC power source 2 and the circuit breaker arrangement and there, in parallel to the switching contact $C_f$, to the main current path 4. There, the potential $U_+$ is always greater than the potential $U_-$ on the opposite switch side at which the second semiconductor switch (MOSFET) 10b is guided to the main circuit 4. The positive potential $U_+$ is 0V when the switching contacts $C_n$ of the circuit breaker arrangement 5, 6, 8 are closed.

The first semiconductor switch (IGBT) 10a is wired with a freewheeling diode D2. On the anode side, a first Zener diode D3 is connected to the potential $U_-$, and on the cathode side, to the gate (control input 11) of the first semiconductor switch (IGBT) 10a. Another Zener diode D4 is in turn connected cathode-side to the control input 11 and on the anode side to the emitter of the first semiconductor switch (IGBT) 10a. A diode D1 is guided on the anode side to a center tap or cascode tap 17 between the first and second semiconductor switches 10a and 10b of the cascode arrangement, said diode being connected to the potential $U_-$ on the cathode side via a capacitor C serving as the energy store. Via an anode-side voltage tap 18 between the diode D1 and the energy store or the capacitor C, a transistor TI wired with ohmic resistors R1 and R2 is connected via further resistors R3 and R4 to the gate of the second semiconductor switch 10b, which is in turn guided to the control input 11 of the semiconductor electronics 10. A further Zener diode D5 with a parallel resistor R5 is connected to the gate on the cathode side, and on the anode side, it is connected to the emitter of the second semiconductor switch 10b.

On the base side, the transistor TI is driven via a transistor T2, which for its part is connected on the base side via an ohmic resistor R6 to a timing element 19 which is designed, for example, as a monoflop. On the base-emitter side, the transistor T2 is also wired to a further resistor R7.

During the period (arc time interval) following the opening time of the switching contacts $C_n$ of the circuit breaker arrangement 5, 6, 8, the commutation of the switch current I substantially corresponding to the arc current from the main current path 4 to the commutation path 16 of the semiconductor electronics 10 already begins. During the arc time period, the arc current practically splits up between the main current path 4, i.e., over the circuit breakers 5, 6, 8 and the commutation path 16, that is, the semiconductor electronics 10. During this arc time interval, the energy store C is charged. The period is thereby set such that on the one hand, enough energy for a reliable actuation of the semiconductor electronics 10 is available, in particular for their disconnection during a certain period following the time period representing the arc duration. On the other hand, the time is sufficiently short, so that an undesirable contact erosion or wear of the switching contacts $C_n$ of the circuit breaker arrangement 5, 6, 8 is avoided.

With the start of the arc and thus with the formation of the arc voltage, the first semiconductor switch 10a is activated via the resistor R at least so far, that a sufficient charging voltage and a sufficient arc or charging current is available for the capacitors C. For this purpose, a control loop of the electronics 10 is created with the corresponding circuit of the first semiconductor switch 10a having the resistor R and the Zener diode D3, by means of which the voltage is set at the cascode tap 17 to, for example, $U_{Ab}=12V$ (DC). A fraction of the arc current and therefore of the switch current I of the hybrid disconnecting device 1 hereby flows through the first semiconductor switch 10a near the positive potential $U_+$.

The tap voltage is used to supply the drive circuit of the electronics 10 substantially formed by the transistors TI and T2 and the timing element 19 and energy store C. The diode DI connected anode-side to the cascode tap 17 and cathode-side to the capacitor C prevents a return flow of the charging current from the capacitors C and via the commutation path 16 in the direction of the potential $U_-$.

If sufficient energy is contained in the capacitor C and thus in the energy store, and if consequently a sufficiently high control or switching voltage is present at the voltage tap 18, then the transistor TI and consequently the transistor T2 are activated, so that the two semiconductor switches 10a, 10b also fully activate. Due to the substantially lower resistance of the now activated semiconductor switches 10a, 10b, as compared to the very high resistance of the disconnecting section of the main current path 4 formed by the open circuit breaker arrangement 5, 6, 8, the arc or switch current I flows almost exclusively over the commutation path 16. The plus potential $U_+$ thus again resists 0V when the switch current I is commutated to the electronics 10. In consequence, the arc extinguishes between the contacts $C_n$ of the circuit breaker arrangement 5, 6, 8.

The charge capacity and thus the stored energy contained in the capacitor C is dimensioned such that the semiconductor electronics 10 carries the switch current I for a period predetermined by the timing element 19. This period can be set to, for example, 3 ms. The dimensioning of this period and thus the determination of the timing element 19 are essentially governed by the application-specific or typical durations for a complete extinction of the arc as well as by a sufficient cooling of the plasma thereby formed. Here, it is crucial that after disconnecting the electronics 10 and an in turn again high impedance commutation path 16 and accordingly current-blocking semiconductor electronics 10, no new arc can occur on the still-tripped circuit breaker arrangement 5, 6, 8.

After the period determined by the timing element 19 has passed, the switch current I falls to basically zero (I=0 A), while at the same time the switch voltage, for example, increases to the operating voltage supplied by the DC power source $U_{DC}$. The positive potential $U_+$ therefore resists this operating voltage when the commutation path 16 becomes highly resistive due to the blocking of the semiconductor switches 10, causing the electronics 10 to again block the current.

Since at this time, the main current path 4 is electrically open with an at the same time highly resistive commutation path 16, an arc-free direct current interruption between the DC power source $U_{DC}$ and the load 3 is already realized. Accordingly, the connection between the DC source and the load 3 is already reliably separated. As the or in place of the load 3, an electrical device, e.g. an inverter of a photovoltaic system can also be provided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A disconnecting device for interrupting a DC circuit between a DC power source and a load with a circuit breaker arrangement, the disconnecting device comprising:
   a first circuit breaker having a thermal-magnetic or hydraulic-magnetic trigger and a first switching contact;
   a second circuit breaker having a second switching contact;
   a semiconductor electronics that are connected in parallel to the first circuit breaker, which block current when the circuit breaker arrangement is in a current- conducting state and which conduct an arc current at least temporarily when the circuit breaker arrangement is triggered, the arc current generated as a result of an arc being commutated to the semiconductor electronics when the circuit breaker arrangement is triggered from the first circuit breaker;
   a current sensor;
   a module configured for arc detection for detection of an overcurrent, the module cooperating with the current sensor for detecting the current flowing through each of the first circuit breaker and the second circuit breaker; and
   a drive, coupled to the first circuit breaker and the second circuit breaker, for triggering each of the first circuit breaker and the second circuit breaker in an event of a detected overcurrent, by the module, with the occurrence of the arc,
   wherein the semiconductor electronics operate with energy received from the arc current,
   wherein for galvanic isolation of the load from the DC power source, in the event of triggering, the second circuit breaker is connected in series with the semiconductor electronics, and
   wherein the first switching contact and the second switching contact are coupled to a common switching mechanism.

2. The disconnecting device according to claim 1, wherein the semiconductor electronics has a semiconductor switch.

3. The disconnecting device according to claim 1, wherein a control input of the semiconductor electronics is connected with the first circuit breaker of the circuit breaker arrangement such that the semiconductor electronics switches to conduct current when the first circuit breaker or the first switching contact opens, as a result of an arc on the first circuit breaker or the first switching contact.

4. The disconnecting device according to claim 1, wherein the drive is coupled with each circuit breaker of the circuit breaker arrangement.

5. The disconnecting device according to claim 1, wherein the disconnecting device is a two-pole or four-pole disconnecting device, and
   wherein the disconnecting device further comprises a first input terminal and a first output terminal having a main current path between the first input terminal and the first output terminal and the circuit breaker arrangement with the first switching contact that is switched in the main current path.

6. The disconnecting device according to claim 5, wherein between a second input terminal and a second output terminal a return current path in which the second circuit breaker or the second switching contact is connected.

7. The disconnecting device according to claim 5, wherein the first switching contact and the second switching contact are switched simultaneously.

8. The disconnecting device according to claim 1, wherein the second circuit breaker is arranged between the first circuit breaker and the load.

9. The disconnecting device according to claim 1, wherein the second circuit breaker is connected to the thermal-magnetic or hydraulic-magnetic trigger.

10. The disconnecting device according to claim 1, wherein the semiconductor electronics comprise a capacitor to store the energy for operating the semiconductor electronics.

11. The disconnecting device according to claim 1, wherein the second circuit breaker is arranged between the first circuit breaker and the current sensor.

12. The disconnecting device according to claim 1, wherein the semiconductor electronics have no additional power source.

13. The disconnecting device according to claim 1, wherein the semiconductor electronics are current blocking.

14. The disconnecting device according to claim 1, wherein the semiconductor electronics receive energy necessary for operation from the disconnecting device.

15. The disconnecting device according to claim 1, wherein when a current limit of a nominal current is exceeded, the first circuit breaker and the second circuit breaker are simultaneously triggered.

16. A system, comprising:
   a DC power source;
   a load;
   a disconnecting device for interrupting a DC circuit between the DC power source and the load, the disconnecting device comprising:
   a first circuit breaker having a first switching contact and a thermal-magnetic or hydraulic-magnetic trigger;
   a second circuit breaker having a second switching contact;
   a semiconductor electronics that are connected in parallel to the circuit breaker, wherein the semiconductor electronics block current when the circuit breaker is in a current-conducting state and conduct an arc current generated when the circuit breaker is triggered;
   a current sensor;
   a module configured for arc detection for detection of an overcurrent, the module cooperating with the current sensor for detecting the current flowing through each of the first circuit breaker and the second circuit breaker; and
   a drive, coupled to the first circuit breaker and the second circuit breaker, for triggering each of the first circuit breaker and the second circuit breaker in an event of a detected overcurrent, by the module, with the occurrence of the arc,
   wherein the semiconductor electronics operate with energy received from the arc current,
   wherein the arc current is commutated to the semiconductor electronics when the circuit breaker is triggered, wherein for galvanic isolation of the load from the DC power source, in the event of triggering, the second circuit breaker is connected in series with the semiconductor electronics, and wherein the first switching contact and the second switching contact are coupled to a common switching mechanism.

\* \* \* \* \*